United States Patent
Chen et al.

(10) Patent No.: US 8,498,343 B2
(45) Date of Patent: Jul. 30, 2013

(54) SYSTEM FOR MIMO EQUALIZATION OF MULTI-CHANNEL TRANSCEIVERS WITH PRECODING

(75) Inventors: Jie Chen, San Jose, CA (US); Keshab K. Parhi, Maple Grove, MN (US)

(73) Assignee: Leanics Corporation, Maple Grove, MN (US)

( * ) Notice: Subject to any disclaimer, the term of this patent is extended or adjusted under 35 U.S.C. 154(b) by 231 days.

(21) Appl. No.: 12/806,538

(22) Filed: Aug. 16, 2010

(65) Prior Publication Data

US 2011/0255576 A1    Oct. 20, 2011

Related U.S. Application Data

(60) Provisional application No. 61/274,904, filed on Aug. 24, 2009.

(51) Int. Cl.
*H04B 14/04*    (2006.01)
(52) U.S. Cl.
USPC .............................. 375/242; 375/219; 375/229
(58) Field of Classification Search
USPC ................................................. 375/219, 222
See application file for complete search history.

(56) References Cited

U.S. PATENT DOCUMENTS

2007/0014378 A1*  1/2007  Parhi et al. ............... 375/267
2008/0285573 A1*  11/2008  Diab et al. ............... 370/401

* cited by examiner

*Primary Examiner* — Sam K Ahn
*Assistant Examiner* — Janice Tieu (57) ABSTRACT

The present invention relates to data processing techniques in multi-channel data transmission systems. In this invention, a method to efficiently deal with FEXT is proposed and a circuit architecture to implement the proposed MIMO-THP equalizer is developed for the application of high/ultra-high speed Ethernet systems. The proposed method relies on the fact that FEXT inherently contains information about the symbols transmitted from the far end transmitters and it can be viewed as a signal rather than noise. Compared with the traditional FEXT cancellation approaches, the proposed design inherits both advantages of MIMO equalization technique and TH precoding technique, thus having better performance. Unlike the existing MIMO-THP technology, the proposed design completely removes the feedback loops in the existing MIMO-THP architecture. Therefore, pipelining techniques can be easily applied to obtain a high-speed design of a multi-channel DSP transceiver.

23 Claims, 13 Drawing Sheets

Fig. 1

PRIOR ART

Fig. 2

PRIOR ART

Fig. 3

PRIOR ART

Fig. 4

PRIOR ART

(a) A TH precoder    (b) Equivalent Form of a TH Precoder

Fig. 5

PRIOR ART (a) Decision Feedback Equalizer (b) TH precoding for DFE

Fig. 6

PRIOR ART

Fig. 7

PRIOR ART

Fig. 8

PRIOR ART

Fig. 9

PRIOR ART

Fig. 10

PRIOR ART

SYSTEM FOR MIMO EQUALIZATION OF MULTI-CHANNEL TRANSCEIVERS WITH PRECODING

CROSS-REFERENCE TO RELATED APPLICATIONS

This application claims the benefit of U.S. Provisional Application No. 61/274,904, filed on Aug. 24, 2009, the entire content of which is incorporated herein by reference in its entirety.

FIELD OF THE INVENTION

The present invention relates to data processing and transmission in wire-lined communication systems. More specifically, it relates to multi-input multi-output (MIMO) equalization in multi-channel transceivers with TH precoding.

BACKGROUND OF THE INVENTION

Many wire-line multi-channel communication systems, such as digital subscribe line (DSL) systems and gigabit/multi-gigabit Ethernet systems suffer from inter-symbol interference (ISI) and cross-talk interferences, such as echo, near-end crosstalk (NEXT), and far-end crosstalk (FEXT). Traditionally, equalization is individually performed at each channel to combat ISI, and noise cancellation technique is applied at the receiver side to mitigate the effect of echo, NEXT and FEXT interference. However, it is noticed that FEXT inherently contains information of the signals transmitted from the far end transmitters, and it is important to exploit this information in FEXT to facilitate signal recovery rather than simply cancel it as noise. Hence, a new joint equalization scheme which can efficiently deal with ISI and also make use of information in FEXT to achieve better performance is needed in a high-speed design of the multi-channel DSP transceiver.

Fully utilizing FEXT information in a high-speed design of the multi-channel DSP transceiver is not trivial. One prior art (See, Keshab K. Parhi, and Yongru Gu, "System and method for MIMO equalization for DSP transceivers", U.S. Pat. No. 7,561,633, filed on Jul. 14, 2009) proposed to use a typical MIMO-DFE structure to jointly deal with both FEXT and ISI in 10GBASE-T (See, J. Chen, Y. Gu and K. K. Parhi, "MIMO Equalization and Cancellation for 10GBASE-T," in *Proc. of 2006 IEEE Int. Conf. on Acoustics, Speech, and Signal Processing (ICASSP)*, vol. 4, pp. 637-640, May 2006). Although the advantage of the MIMO equalization technique has been demonstrated, the main drawback is that the MIMO-DFE architecture suffered from the error propagation problem, which degrades system performance significantly when input SNR is very low. In addition, the feedback loops inside the MIMO-DFE architecture limit their high-speed implementation in a DSP transceiver. To eliminate the problem of error propagation in real applications, another prior art proposed to apply Tomlinson-Harashima Precoder (THP) into MIMO equalization, and simply implemented the MIMO-DFE part at the transmitter side to pre-equalize the cross-channel interferences, i.e., a straight-forward MIMO-THP equalization scheme (See, Y. Chien, Y. Tu, H. Tsao, and W. Mao, "Equalization and interference cancellation with MIMO THP for 10GBASE-T," in 2007 *IEEE Workshop on Signal Processing Systems*, pp. 95-100, 2007). However, the resulting MIMO-THP architecture is not supported in the 10GBASE-T standard, where only four separate TH precoders are required at each channel. In addition, the high-speed implementation of a MIMO-TH precoder is very difficult.

To solve these problems, a new equalization scheme which combined the general MIMO equalization technique with the TH precoding technique was proposed in one of our previous inventions (See, Keshab K. Parhi, and Yongru Gu, "System and method for MIMO equalization for DSP transceivers", U.S. Pat. No. 7,561,633, filed on Jul. 14, 2009), where the proposed method inherited the advantage of MIMO equalization and also alleviated the error propagation problem such that a better SNR performance could be achieved. In addition, the proposed architecture complied with current 10GBASE-T standard and could be applied into the real application of a 10GBASE-T DSP transceiver design. However, the partial MIMO-DFE structure used in the proposed design to combat the residual post-cursor FEXT still has cross-feedback filters, which limit their high speed implementation. Moreover, due to effect of the TH precoding, the inputs to these feedback filters are not finite numbers any more, which will further increase the hardware implementation cost.

What is needed is a new design methodology and an implementation method for efficiently dealing with both ISI and FEXT crosstalk in a multi-channel system such that the limitations of the existing schemes can be overcome and a high-speed implementation of the proposed scheme with low complexity can be achieved in a DSP transceiver design.

BRIEF SUMMARY OF THE INVENTION

The present invention describes an equalization scheme which combines the general MIMO equalization technique with the TH precoding technique to jointly deal with both ISI and FEXT interferences, and develops a new MIMO-THP architecture which is compliant with current 10GBASE-T standard and suitable for high-speed implementation in a multi-channel data transmission system.

In accordance with the present invention, relying on the fact that FEXT inherently contains information about the symbols transmitted from far end transmitters, FEXT is treated as signal rather than noise, and a new equalization scheme is proposed by combining the MIMO equalization technique and TH precoding technique to jointly deal with both ISI and FEXT. Different from the conventional MIMO-DFE structure, an equalization structure is applied with four separate THPs at the transmitter side and a MIMO-FFE structure at the receiver side to jointly deal with ISI and pre-cursor FEXT. Thus, the proposed design inherits both advantages of MIMO equalization and TH precoding. Unlike the previous invention, a partial MIMO-FFE structure rather than a partial MIMO-FBE structure is proposed to be used to combat the residual post-cursor FEXT. Thus, the feedback loops in previous invention can be completely removed such that the resulting design can be easily pipelined and can be used in high speed applications. Furthermore, a modified design is also developed to reduce the hardware complexity of the partial MIMO-FFE.

Further embodiments, features, and advantages of the present invention, as well as the structure and operation of the various embodiments of the present invention are described in detail below with reference to accompanying drawings.

BRIEF DESCRIPTION OF THE DRAWINGS/FIGURES

The present invention is described with reference to the accompanying figures. The accompanying figure, which are incorporated herein, form part of the specification, illustrate the present invention and, together with the description, further serve to explain the principles of the invention and to enable a person skilled in the relevant art to make and use the invention.

Table 1 lists the performance comparison for different designs in terms of average decision-point (DP) SNR at the steady state.

DETAILED DESCRIPTION OF THE INVENTION

Background on MIMO Equalization in Ethernet Systems

Figure 1:
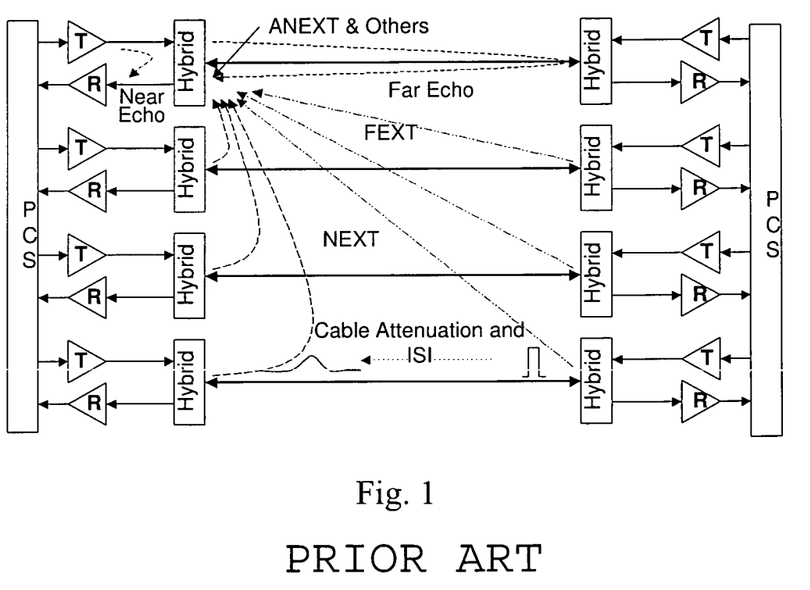
FIG. 1 illustrates the data transmission over a typical channel model of 4 pairs of UTP in a 10GBASE-T system.

Consider signal transmission path over a typical multiple channel environment shown in FIG. 1, FEXT interferences are generated by disturbing signals from adjacent transmitters at the far end of the transmission link, and pass through the victim channel, i.e., the first channel in FIG. 1. It is noticed that each far end signal is transmitted by four sub-channels, three of which are FEXT channels. In other words, for each receiver end, FEXT inherently contains information about the signals transmitted from the other three far-end transmitters. Hence, it is important to exploit FEXT as a signal rather than simply cancel it as noise.

Figure 2:
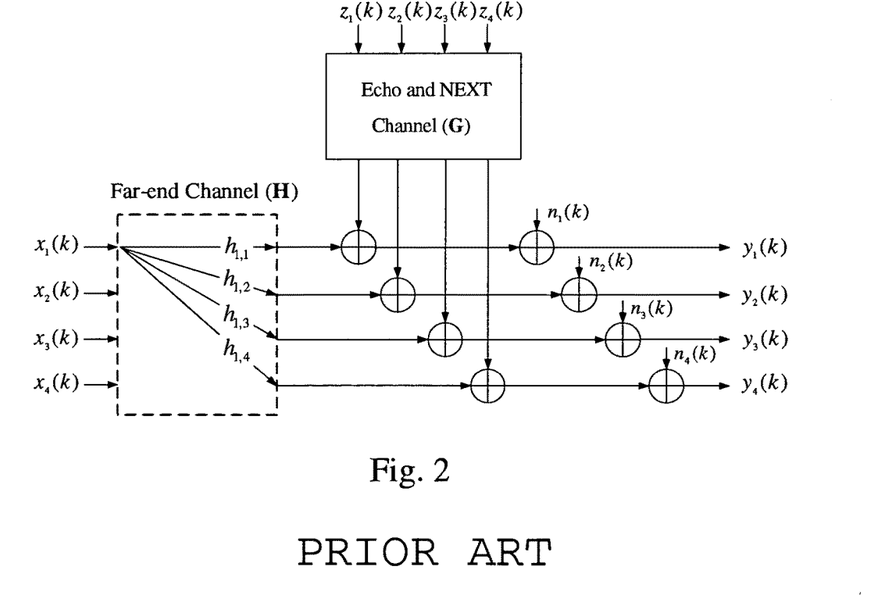
FIG. 2 illustrates the MIMO channel model of a 4 pairs of UTP cable in a typical 10GBASE-T system.

To utilize FEXT information and improve the system performance, MIMO equalization technique was proposed in a typical 10GBASE-T system. First, a typical 10GBASE-T transmission channel over four pairs of UTP was modeled as two 4×4 MIMO channels as shown in FIG. 2. In this figure, $h_{i,j}$ denoted the MIMO channel impulse response from the ith input to the jth output with length v+1 and $g_{m,n}$ denoted the echo and NEXT channel impulse response from the mth input to the nth output with length l+1. Let $x_i$ denote the transmitted symbol sequence from the ith far end transmitter and $z_m$ denote the transmitted symbol sequence from the mth near end transmitter, and $n_j$ denote background noise at the jth channel output. Then the jth channel received symbol sequence was given by $$y_j = \sum_{i=1}^{4} h_{i,j} \otimes x_i + \sum_{m=1}^{4} g_{m,j} \otimes z_m + n_j \quad \text{EQ. (1)}$$

for j=1, ..., 4. where $\otimes$ denotes convolution.

By grouping symbols from four received channels at time k into a column vector $y(k) \triangleq [y_1(k) y_2(k) y_3(k) y_4(k)]^T$, EQ. (1) could be expressed as $$y(k) = \sum_{\tau=0}^{\nu} H_\tau x(k-\tau) + \sum_{p=0}^{l} G_p z(k-p) + n(k) \quad \text{EQ. (2)}$$

where $H_\tau$ and $G_p$ represented 4×4 τth far end channel coefficient matrix and pth near end channel coefficient matrix, respectively. The signals x(k−τ) and z(k−τ) corresponded to far end transmitted column vector and near end transmitted column vector at time index k−τ, respectively. By stacking $N_f$ successive channel output vector samples, EQ. (2) could be expressed as in matrix form $$y(k+N_f-1:k) = H \cdot x(k+N_f-1:k-v) + \quad \text{EQ. (3)}$$
$$G \cdot z(k+N_f-1:k-l) + n(k+N_f-1:k).$$

where $y(k+N_f-1:k)$ was a column vector with dimension $4N_f \times 1$, and it was defined as $$y(k+N_f-1:k) \triangleq [y^T(k+N_f-1) \ldots y^T(k)]^T. \quad \text{EQ. (4)}$$

Similar definitions were applied to $x(k+N_f-1:k-v)$, $z(k+N_f-1:k-l)$, and $n(k+N_f-1:k)$. In addition, matrix H and matrix G were both block Toeplitz matrices with dimension $N_f \times (N_f+v)$ and $N_f \times (N_f+l)$, respectively.

$$H = \begin{bmatrix} H_0 & H_1 & \cdots & H_v & 0 & \cdots & 0 \\ 0 & H_0 & H_1 & \cdots & H_v & \cdots & 0 \\ \vdots & & \ddots & & & \ddots & \\ 0 & \cdots & 0 & H_0 & H_1 & \cdots & H_v \end{bmatrix}, \quad \text{EQ. (5)}$$

$$G = \begin{bmatrix} G_0 & G_1 & \cdots & G_l & 0 & \cdots & 0 \\ 0 & G_0 & G_1 & \cdots & G_l & \cdots & 0 \\ \vdots & & \ddots & & & \ddots & \\ 0 & \cdots & 0 & G_0 & G_1 & \cdots & G_l \end{bmatrix}. \quad \text{EQ. (6)}$$

Figure 3:
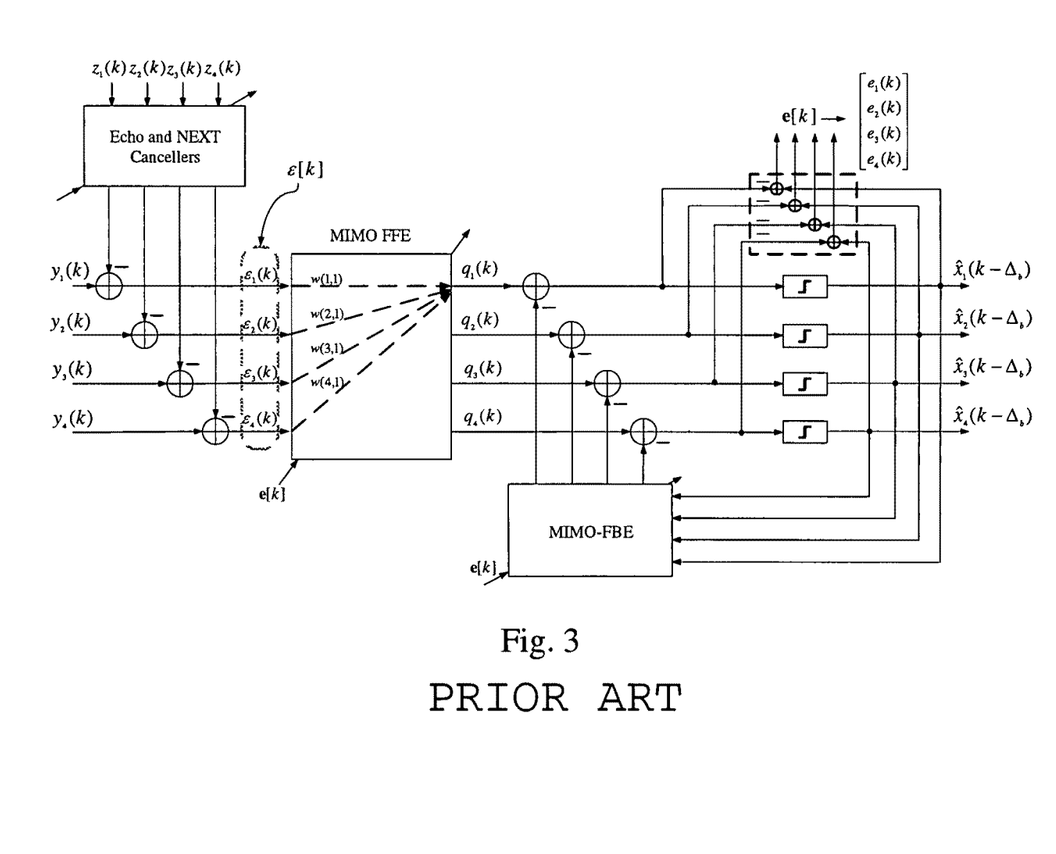
FIG. 3 illustrates block diagram of a typical MIMO-DFE equalization and cancellation adaptive structure.
Figure 4:
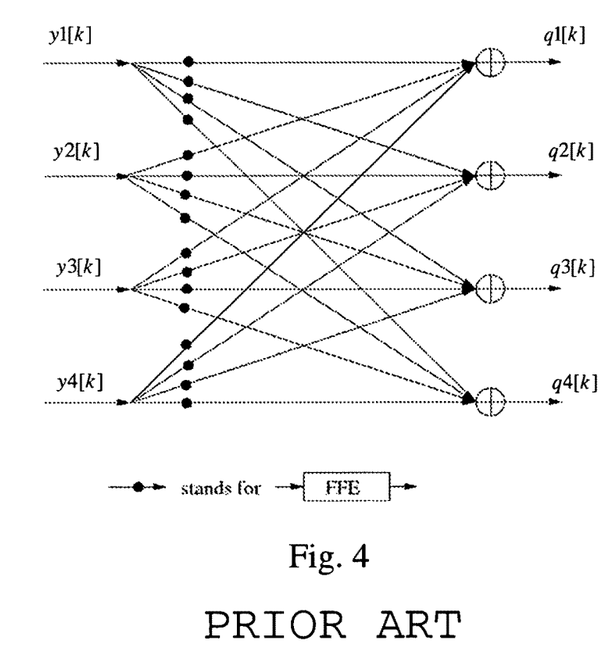
FIG. 4 illustrates the detailed block diagram of the MIMO-FFE equalizers.

FIG. 3 shows the block diagram of the previously proposed MIMO-DFE equalization and noise cancellation scheme. In this figure, echo and NEXT are cancelled from $y_i(k)_{i=1,2,3,4}$ to eliminate echo and NEXT interferences since the near end transmitted signal $z_i(k)_{i=1,2,3,4}$ was known to the receiver at the same end. After that, a MIMO FFE which consists of 16 FFEs as shown in FIG. 4 is used to combat pre-cursor ISI and exploit far end signal transmitted from FEXT channels. Instead of using FEXT cancellers, a MIMO-FBE which has a similar architecture as shown in FIG. 4, is used to deal with residual post-cursor FEXT. Since the whole receiver architecture operates in an adaptive manner, the echo and NEXT cancellers and MIMO-DFE are independently adapted to minimize $E(\epsilon^2)$ and $E(e^2)$. The optimal coefficients of these filters could be obtained by applying the classical least mean square (LMS) algorithm.

Although the MIMO-DFE based equalization scheme has been proven to be effective on utilizing FEXT, one problem associated with MIMO-DFE architecture is the catastrophic error propagation, which degrades equalization performance significantly when SNR gain at the decision point is very low. In addition, the feedback loops inside the MIMO-DFE architecture limit their high speed implementation. Recently, TH precoding has been proposed to be used in 10GBASE-T because it can eliminate error propagation and allow use of capacity-achieving channel codes, such as low-density parity-check (LDPC) codes, in a natural way. Therefore, it is of great interest to combine the MIMO equalization technique with the TH precoding technique to develop a practical equalization scheme which is suitable for high speed application and also compatible with the 10GBASE-T standard.

Previous Invention on the MIMO-THP MMSE Design

Figure 5:
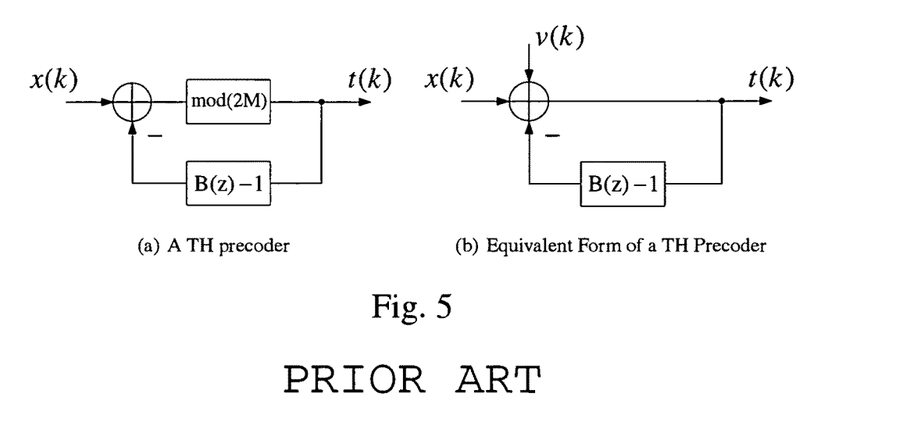
FIG. 5 illustrates Tomlinson-Harashima precoder and its equivalent form.
Figure 6:
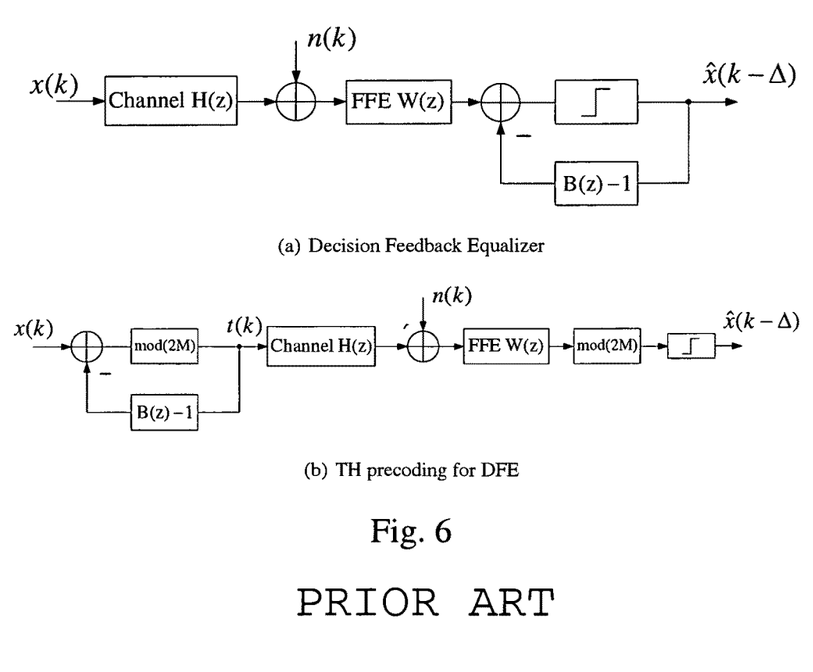
FIG. 6 illustrates the block diagram of a typical application of TH precoder, which is converted from a traditional DFE structure.

To describe the proposed design, the TH precoder is briefly introduced. The TH precoder was first proposed by Tomlinson and Harashima in 1971 (See, M. Tomlinson, "New automatic equalizer employing modulo arithmetic," *Electron. Lett.*, vol. 7, pp. 138-139, March 1971; and H. Harashima and H. Miyakawa, "Matched-transmission technique for channels with intersymbol interference," *IEEE Trans. Commun.*, vol. 20, pp. 774-780, August 1972). It has similar structure as a traditional DFE, except that the decision device in the DFE is replaced with a modulo device in the TH precoder as shown in FIG. 5(*a*). The operation of TH precoding can be interpreted by using the equivalent form of the TH precoder as shown in FIG. 5(*b*). A unique compensation signal v(k), which is a multiple of 2M, is added to the transmitted M-PAM signal x(k) such that the output of the precoder t(k) lies in the interval [−M, M). If the input of the TH precoder, x(k), is i.i.d, it can be shown that t(k) has uniform distribution over [−M, M). The effective transmitted data sequence in Z-domain is given by $$T(z) = \frac{X(z) + V(z)}{B(z)}, \quad \text{EQ. (7)}$$

where B(z) is a causal FIR filter in the TH precoder feedback path. From (7), it is seen that a TH precoder can be viewed as an IIR filter with the input equal to the sum of the original TH precoder and a finite level compensation signal, i.e., x(k)+v(k). The transmitted signal x(k) can be recovered from the output of the fifth by performing a modulo operation as shown in FIG. 6(*b*).

Figure 7:
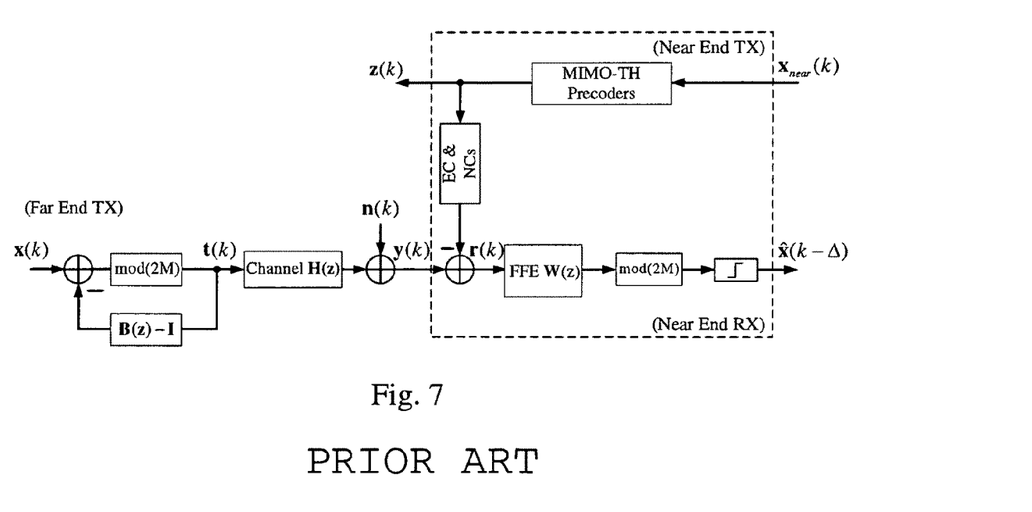
FIG. 7 shows a straightforward design of MIMO equalization combined with TH precoding.
Figure 8:
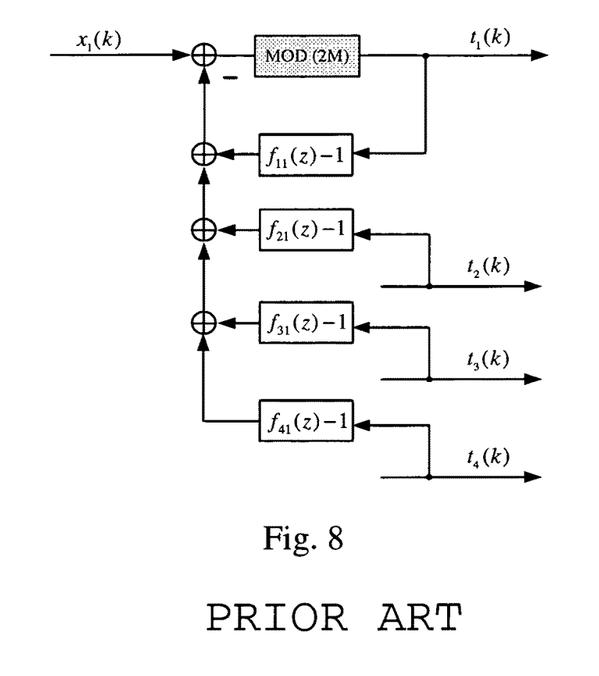
FIG. 8 illustrates the detailed block diagram of a MIMO TH precoder for one pair.

FIG. 7 shows a straightforward design by combining the TH precoding technique with the general MIMO equalization technique. In this figure, x(k) denotes far end transmitted vector. Due to the TH precoding, the effective transmitted vectors going through the physical channel are represented as t(k) and z(k) from far end and near end transmitters, respectively. It should be noted that B(z) represents a MIMO-TH precoder, which is implemented at the transmitter side to pre-equalize the transmitted symbols, and it is not a diagonal matrix. The detailed MIMO-TH precoder structure for one pair is shown in FIG. 8. It consists of four feedback filters with the input of the effective transmitted signals t(k) and a nonlinear modulo device to limit the output dynamic range. At the receiver side, to recover the transmitted signals, a modulo operation is needed before the decision device. However, this straightforward design is not compatible with the current 10GBASE-T standard, where only four separate TH precoders are required for each channel. Besides, the high speed design of the MIMO-TH precoder is still a challenging problem.

Figure 9:
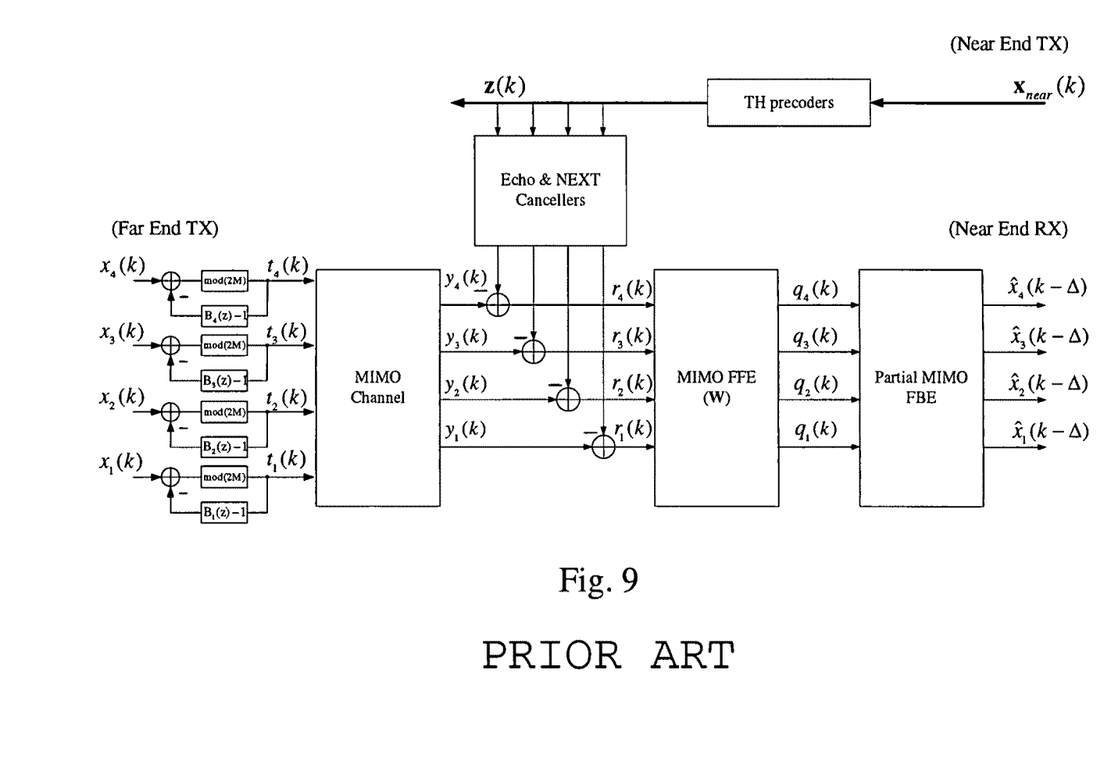
FIG. 9 shows the block diagram of the proposed MIMO equalization with TH precoding in previous invention.
Figure 10:
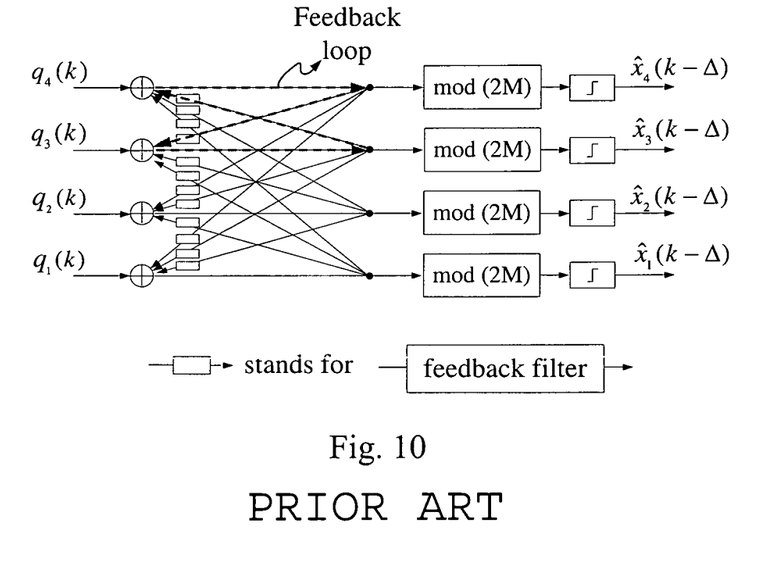
FIG. 10 shows the block diagram of the partial MIMO-FBE.

To develop a transceiver architecture complying with the IEEE 802.3an standard while maintaining the same system performance as the design in FIG. 7, in the previous invention (See, Keshab K. Parhi, and Yongru Gu, "System and method for MIMO equalization for DSP transceivers", U.S. Pat. No. 7,561,633, filed on Jul. 14, 2009) we proposed to retain four SISO TH precoders at the transmitter side and implement the cross-channel pre-equalizers at the receiver side. The block diagram of previously proposed architecture is shown in FIG. 9. In this figure, four individual TH-precoders are used at the transmitter to pre-equalize each channel by removing the post-cursor ISI. At the receiver, a MIMO FFE filter is used to remove pre-cursor ISI and exploit the FEXT signals. In addition, a partial MIMO-FBE filter is used to combat the residual post-cursor FEXT. The detailed block diagram of the partial MIMO-FBE is shown in FIG. 10. It contains 12 cross-feedback filters, four nonlinear modulo devices and slicers.

Proposed MIMO Equalization Incorporated with TH Precoding

From FIG. 10, it is noted that the inputs to these 12 cross-feedback filters are not easy to obtain due to the TH precoding, which changes the transmitted signal $x_i(k)$ to $t_i(k)$. In addition, the cross-feedback loops inside the partial MIMO-FBE filter limit the high-speed implementation of these filters. To solve these problems, a new MIMO-THP equalization scheme is proposed such that the feedback loops can be completely removed without losing system performance.

Figure 11:
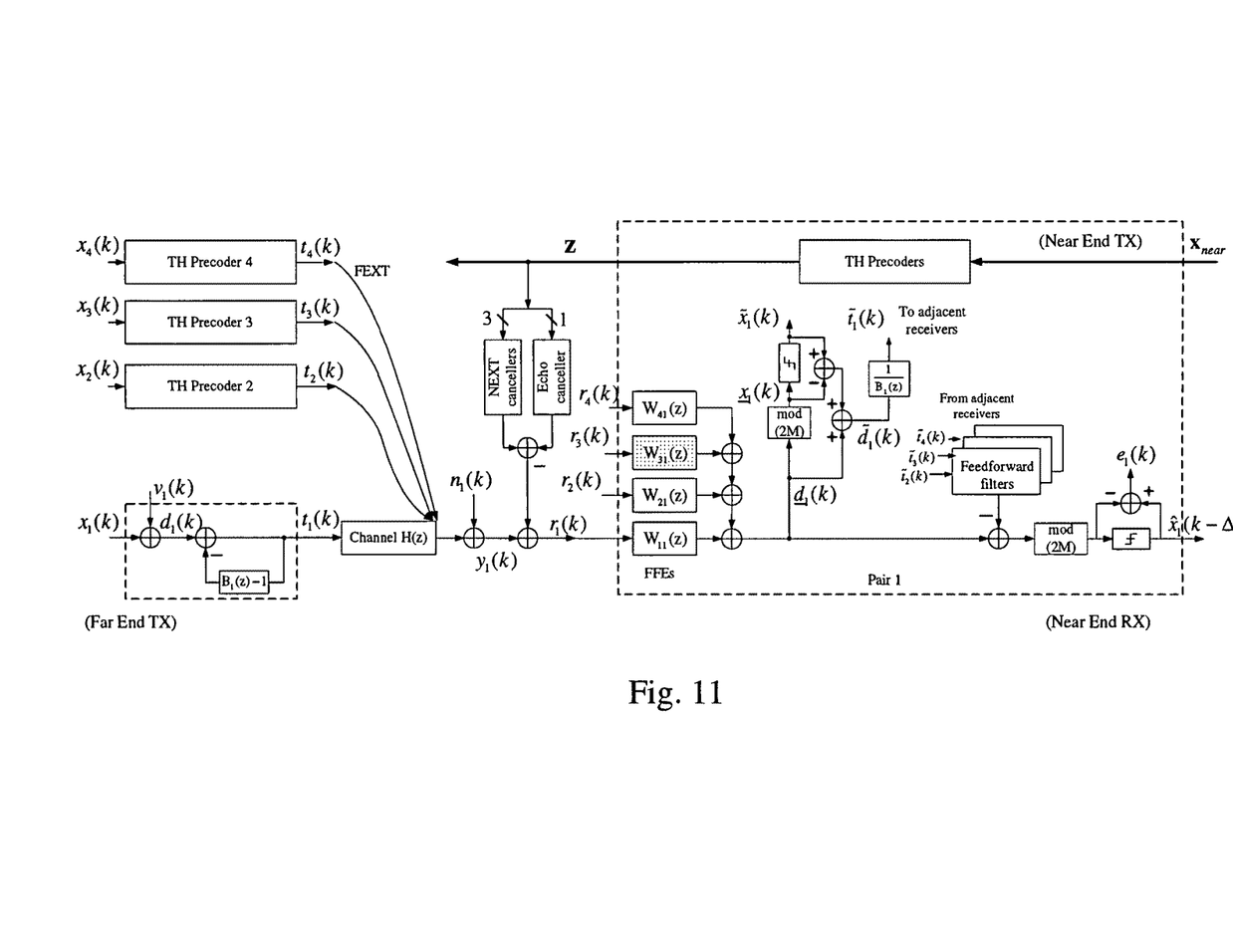
FIG. 11 shows the block diagram of the proposed MIMO equalization architecture with TH precoding.

FIG. 11 shows the block diagram of the proposed MIMO-THP equalization scheme in a multi-channel data transmission system. At the far end transmitter, the transmitted signal $x_i(k)_{i=1,2,3,4}$ is first pre-equalized by four individual TH precoders. The outputs of the TH precoders $t_i(k)_{i=1,2,3,4}$ are transmitted through the multi-pair channel. At the near end receiver, pair 1 is taken as an example to illustrate the architecture of the receiver, and the other three pairs will have similar architectures. In this figure, the received noisy signal $y_1(k)$ contains FEXT interferences, echo and NEXT interferences (which are not shown in the figure), and additive white noise $n_1(k)$. First, echo and NEXT cancellation is performed to obtain the signal $r_1(k)$. After that, signal $r_1(k)$ is fed to the MIMO-FFE filters $W_{i,1}(z)_{i=1,2,3,4}$ to jointly process the pre-cursor ISI and FEXT such that FEXT can be efficiently utilized. Ideally, if channel equalization is perfect, the output of the MIMO-FFE, $d_1(k)$, will only contain $x_1(k)+v_1(k)+n_1(k)$, as well as residual post-cursor FEXT interferences. Because the residual FEXT interference is small, a reliable tentative decision $\tilde{d}_1(k)$ can be obtained at the output of MIMO-FFE. Based on this idea, the tentative decision $\tilde{d}_1(k)$ is obtained by slicing $\bar{d}_1(k)$ at the output of MIMO-FFE rather than the output of MIMO-FBE. To avoid using a complex multi-level slicer, an alternate implementation is shown in FIG. 11. To further combat the residual post-cursor FEXT interferences, a partial MIMO-feedforward filter (containing 12 cross filters) is used with the input signal $\tilde{t}_i(k)_{i=2,3,4}$.

Compared with the proposed design in previous invention (See, Keshab K. Parhi, and Yongru Gu, "System and method for MIMO equalization for DSP transceivers", U.S. Pat. No. 7,561,633, filed on Jul. 14, 2009), the main difference is that the partial MIMO-FBE filter in the receiver is changed to be the partial MIMO-FFE filter, which has no cross-feedback filters and is easy for high-speed implementation. The performance of the proposed design can be evaluated in terms of average decision-point SNR (DP-SNR) over multiple pairs (See, N. Al-Dhahir and A. H. Sayed, "The finite-length mulit-input multi-output MMSE-DFE," *IEEE Trans. Signal Processing*, vol. 48, pp. 2921-2936, October 2000), and the average (DP-SNR) can be calculated as:

$$SNR_{avg} = 10\log_{10}\left(\frac{\frac{1}{(L+N_1)}\text{trace}(R_{tt})}{\frac{1}{4}\text{trace}(R_{ee,min})}\right), \quad (8)$$

where $R_{tt}$ is the $(L+N_1) \times (L+N_1)$ auto-correlation matrix of signal $t_i(k)$, and $R_{ee,min}$ is the minimum decision error auto-correlation with dimension 4×4.

Figure 12:
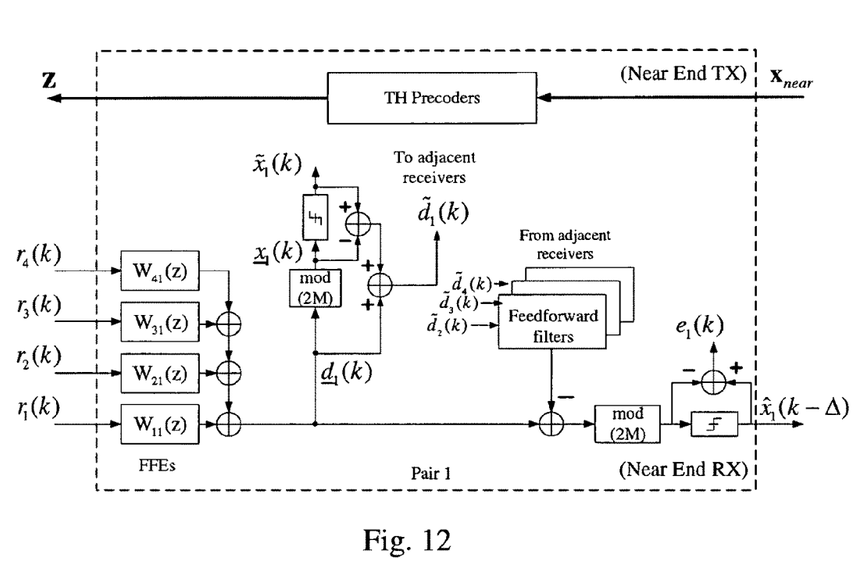
FIG. 12 shows the block diagram of a modified design of the proposed MIMO-THP architecture.

FIG. 12 shows a modified design of the proposed MIMO-THP equalization scheme. In this figure, the IIR filter $$\frac{1}{B_i(z)}$$

after $\tilde{d}_i(k)$ is removed such that all units in the receiver do not contain any feedback loops. Thus, pipelining techniques can be easily applied to speed up the operation (See, e.g., K. K. Parhi, *VLSI Digital Signal Processing System Design and Implementation*, John Wiley & Son, Inc., New York, 1999). It is also noticed that $\tilde{d}_i(k)$ has only finite number of values, and the feed-forward filter with input $\tilde{d}_i(k)$ can be efficiently implemented by applying techniques such as pre-computation and look-ahead. It may be noted that the designs in FIG. 11 and FIG. 12 are only examples of MIMO equalizations for systems using TH precoders. Other embodiments not shown here can be derived by a person skilled in the relevant art by using the main ideas of this invention.

Simulation Results

Figure 13:
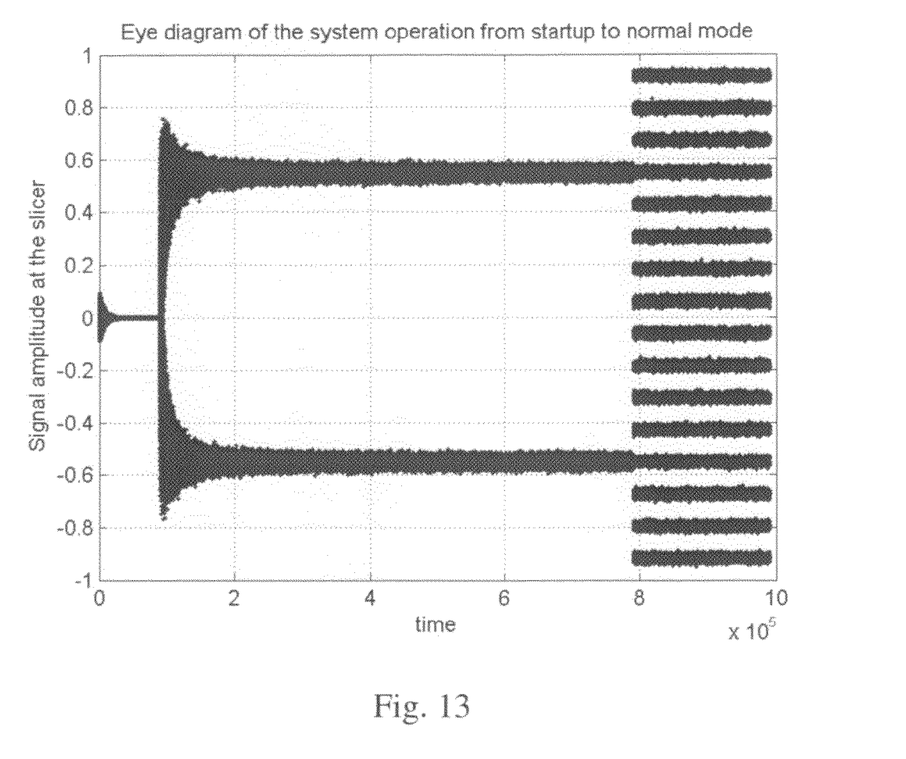
FIG. 13 illustrates a discrete time eye diagram of the system operation from startup to normal mode.

Finally, some simulation results are presented to evaluate the proposed designs. FIG. 13 illustrates the system operation from startup to normal data mode. In this figure, the discrete eye diagram is obtained by plotting the symbol values before the decision device and the simulation is performed based on Cat-6 75 m channel model. Notice that the training symbols only have two possible values, i.e., {-9, 9}, to keep the transmit power in the training mode the same as the transmit power in normal mode.

Table 1 gives the performance comparison for different designs. In this table, each design is evaluated based on Cat-6 measured channel models with different lengths: 100 m, 75 m, and 55 m respectively. The analytical result (a) is also listed to be compared with the simulation result (b) for each design. Consider the results in the traditional MIMO-DFE structure (FIG. 3), it is seen that the error propagation problem is alleviated. Especially, for short cable cases, the simulation results are very close to the analytical results. This indicates that the error propagation is not severe in high DP-SNR cases. For the MIMO-THP scheme shown in FIG. 7, the error propagation problem is eliminated by using the TH precoding. As we can see from Table 1, the MIMO-THP structure has better performance than the MIMO-DFE structure for 100 m Cat-6 case. However, for high SNR cases (i.e., 75 m and 55 m), the simulated DP-SNR is a little bit worse than the MIMO-DFE structure. This is due to the effect of the estimation errors in the TH precoders (See, M. Huang, X. Zhang, S. Zhou, and J. Wang, "Tomlinson-Harashima precoding in multiuser MIMO systems with imperfect channel state information," in *Proceedings of IEEE GLOBECOM* 2007, Washington, pp. 2806-2810, November 2007). The proposed design I (FIG. 11) is obtained by combining the MIMO equalization technique and the TH precoding technique, and it can achieve similar performance as its counterparts as expected. Compared with the proposed design I, the performance degradation in terms of simulation results in the proposed design II (FIG. 12) is because an FIR filter is used to approximate an IIR filter in the cross-feedforward filter at the receiver.

CONCLUSIONS

A new equalization scheme is proposed by combining the MIMO equalization technique and TH precoding technique to deal with both ISI and FEXT. Different with the existing works, the proposed designs inherit the advantage of MIMO equalization and also alleviate the error propagation. In addition, they comply with the 10GBASE-T standard and are also suitable for high speed application because feedback loops in the receiver are completely removed so that pipelining techniques can be easily applied.

It will be understood by those skilled in the art that various changes in form and details can be made therein without departing from the spirit and scope of the invention as defined in the appended claims. Thus, the breadth and scope of the present invention should not be limited by any of the above-described exemplary embodiments, but should be defined only in accordance with the following claims and their equivalents.

TABLE 1

| | Average DP-SNR (dB) | | | | | | | | | |
|---|---|---|---|---|---|---|---|---|---|---|
| CAT-6 UTP | MIMO-DFE (FIG. 3) | | Straightforward MIMO-THP (FIG. 7) | | Previous proposed MIMO-THP (FIG. 9) | | Proposed design I (FIG. 11) | | Proposed design II (FIG. 12) | |
| Cable | (a) | (b) | (a) | (b) | (a) | (b) | (a) | (b) | (a) | (b) |
| Measured 100 m | 30.71 | 29.95 | 30.72 | 30.25 | 30.72 | 30.68 | 30.72 | 30.64 | 30.72 | 29.57 |
| Measured 75 m | 36.94 | 36.93 | 36.95 | 36.91 | 36.94 | 36.92 | 36.95 | 36.94 | 36.95 | 36.85 |
| Measured 55 m | 41.12 | 41.12 | 41.13 | 41.10 | 41.13 | 41.12 | 41.13 | 41.10 | 41.13 | 40.95 |

What is claimed is:

1. A far-end cross-talk (FEXT) canceller for a precoded multiple-input multiple-output communications system comprising a plurality of receivers, each receiver comprising:
a first feed-forward equalizer (FFE) to process a first received signal, a second feed-forward equalizer (FFE)

to process a second received signal, and a first summer to sum the outputs of the first and second FFE;

a first decision device, comprising a first modulo device and a first slicer, to process the output of the first summer to generate a first tentative decision;

a first feed-forward filter (FFF) to filter a second tentative decision of an adjacent receiver;

a subtractor to compute the difference of the output of the first FFF from the output of the first summer to compute a first FEXT-free output signal;

a second decision device, comprising a second modulo device and a second slicer, to process the first FEXT-free signal to compute a first output symbol.

2. The far-end cross-talk canceller in claim 1 where the first tentative decision is input to a second feed-forward filter (FFF) of an adjacent receiver.

3. The far-end cross-talk canceller in claim 1 where the precoder is a Tomlinson-Harashima precoder.

4. The far-end cross-talk canceller in claim 1 where the first tentative decision is computed by adding the output of the first summer to a first error signal obtained by computing the difference between the input and output of a first slicer of the first decision device.

5. The far-end cross-talk canceller in claim 4 where the first slicer is coupled to the output of a modulo device whose input is coupled to the output of the first summer.

6. The far-end cross-talk canceller in claim 1 where the first tentative decision is filtered by a precoder filter first and the filtered output is input to the second feed-forward filter (FFF) of an adjacent receiver.

7. The far-end cross-talk canceller in claim 6 where the precoder filter is an infinite impulse response filter.

8. The far-end cross-talk canceller in claim 1 where a second error signal across a second slicer of a second decision device coupled to the first FEXT-free signal is used to adapt the second feed-forward filter (FFF) of an adjacent receiver.

9. The far-end cross-talk canceller in claim 1 used in a wireless Ethernet transceiver.

10. The far-end cross-talk canceller in claim 1 integrated by a circuit.

11. The far-end cross-talk canceller in claim 1 used in a communications transceiver containing a first receiver, where the first received signal corresponds to a signal after echo from its near-end transmitter has been cancelled from its input signal.

12. The far-end cross-talk canceller in claim 1 used in a communications transceiver containing a first receiver, where the first received signal corresponds to a signal after near-end cross-talk from an adjacent transmitter has been cancelled from its input signal.

13. An integrated circuit to implement a far-end cross-talk (FEXT) canceller for a precoded multiple-input multiple-output communications system comprising a plurality of receivers, each receiver comprising:

a first feed-forward equalizer (FFE) to process a first received signal, a second feed-forward equalizer (FFE) to process a second received signal, and a first summer to sum the outputs of the first and second FFE;

a first-decision device, comprising a first modulo device and a first slicer to process the output of the first summer to generate a first tentative decision;

a first feed-forward filter (FFF) to filter a second tentative decision of an adjacent receiver;

a subtractor to compute the difference of the output of the first FFF from the output of the first summer to compute a first FEXT-free output signal;

a second decision device, comprising a second modulo device and a second slicer, to process the first FEXT-free signal to compute a first output symbol.

14. The FEXT canceller integrated circuit in claim 13 where the first tentative decision is input to a second feed-forward filter (FFF) of an adjacent receiver.

15. The FEXT canceller integrated circuit in claim 13 where the precoder is a Tomlinson-Harashima precoder.

16. The FEXT canceller integrated circuit in claim 13 where the first tentative decision is computed by a second summer to add the output of the first summer to a first error signal obtained by a subtractor that computes the difference between the input and output of a first slicer of the first decision device.

17. The FEXT canceller integrated circuit in claim 13 where the first slicer is coupled to the output of a modulo device whose input is coupled to the output of the first summer.

18. The FEXT canceller integrated circuit in claim 13 where the first tentative decision is filtered by a precoder filter first and the filtered output is input to the second fed-forward filter (FFF) of an adjacent receiver.

19. The FEXT integrated circuit in claim 18 where the precoder filter is an infinite impulse response filter.

20. The FEXT canceller integrated circuit in claim 13 where a second error signal across a second slicer of a second decision device coupled to the first FEXT-free signal is used to adapt the second feed-forward filter (FFF) of an adjacent receiver.

21. The FEXT canceller integrated circuit in claim 13 used in a wireless Ethernet transceiver.

22. The FEXT canceller integrated circuit in claim 13 used in a communications transceiver containing a first receiver, where the first received signal corresponds to a signal after echo from its corresponding near-end transmitter has been cancelled from its input signal.

23. The far-end cross-talk canceller integrated circuit in claim 13 used in a communications transceiver containing a first receiver, where the first received signal corresponds to a signal after near-end cross-talk from an adjacent transmitter has been cancelled from its input signal.

* * * * *